United States Patent
Johnson

[15] 3,655,217
[45] Apr. 11, 1972

[54] SAFETY DEVICE FOR VEHICLES
[72] Inventor: James T. Johnson, Herrin, Ill.
[73] Assignee: Olin Corporation
[22] Filed: Sept. 18, 1969
[21] Appl. No.: 858,978

[52] U.S. Cl. .................................................280/150 AB
[51] Int. Cl. ..................................................B60r 21/08
[58] Field of Search..............................280/150 AB; 9/321

[56] References Cited

UNITED STATES PATENTS

| | | | |
|---|---|---|---|
| 2,850,291 | 9/1958 | Ziccardi | 280/150 AB |
| 3,222,230 | 12/1965 | Hebenstreit et al. | 9/321 X |
| 3,269,310 | 8/1966 | Wismar | 9/321 |
| 3,336,045 | 8/1967 | Kobori | 280/150 AB |
| 3,450,414 | 6/1969 | Kobori | 280/150 AB |
| 3,532,359 | 10/1970 | Teague et al. | 280/150 AB |

*Primary Examiner*—Benjamin Hersh
*Assistant Examiner*—John A. Pekar
*Attorney*—Donald R. Motsko, H. Samuel Kieser and William W. Jones

[57] ABSTRACT

A safety device for protecting the occupant of a vehicle including an inflatable bag member and a container for storing fluid under pressure. A propellant charge is also included for producing a hot gas upon the ignition thereof to raise the pressure in the container to rupture a rupturable disc to permit the propellant gas and fluid to escape into the bag member and cause the inflation thereof.

5 Claims, 4 Drawing Figures

Patented April 11, 1972
3,655,217
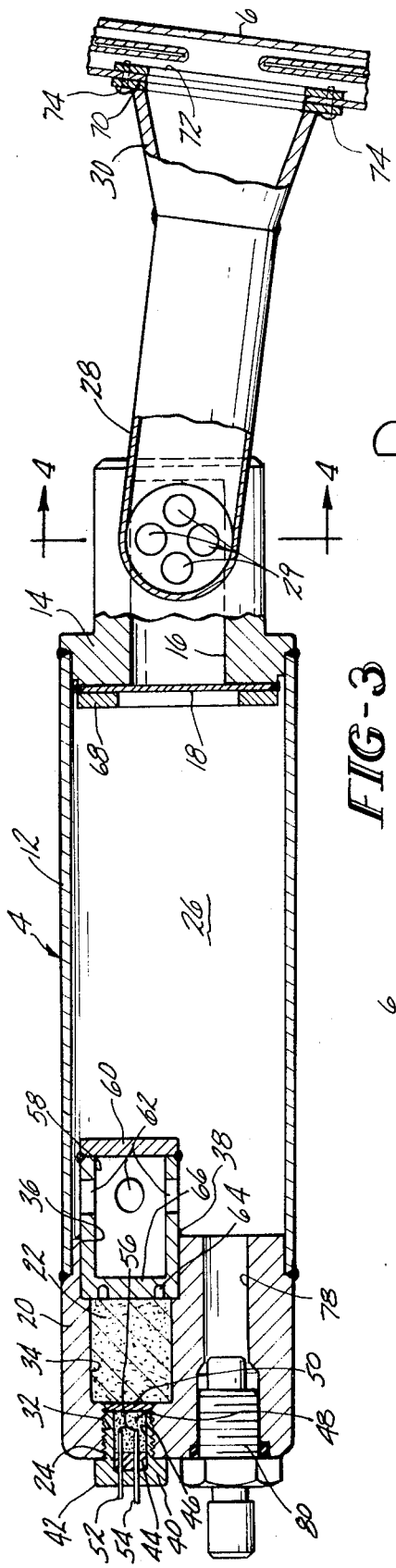
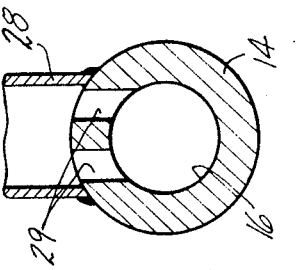
FIG-4
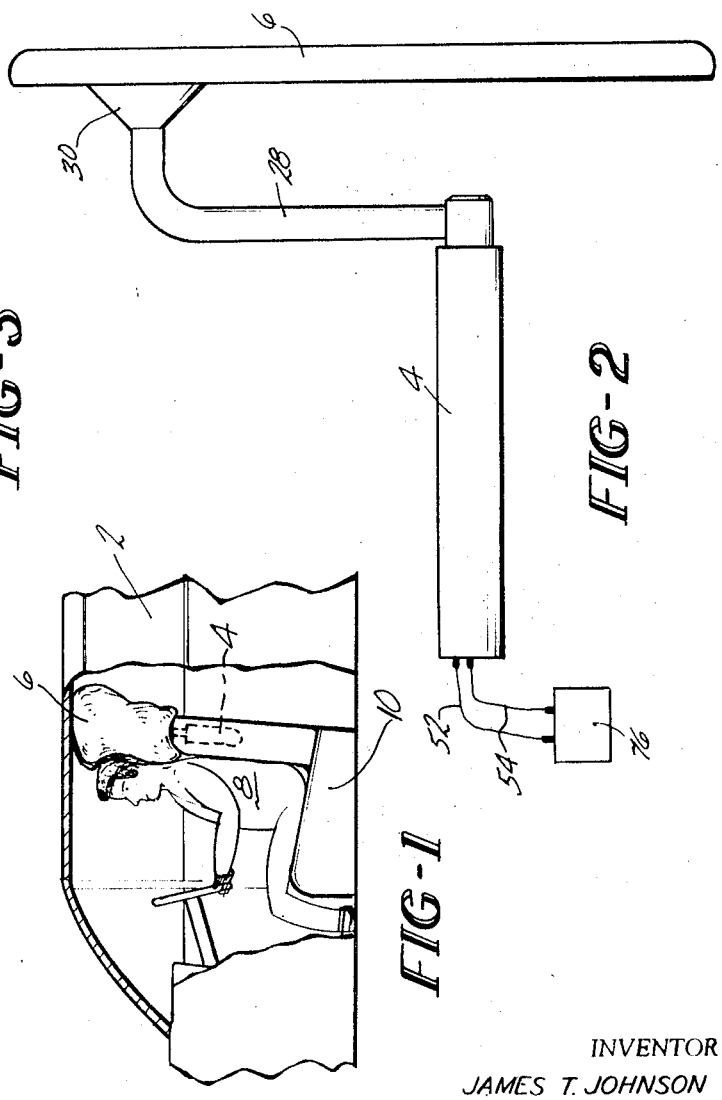
INVENTOR:
JAMES T. JOHNSON
BY
H. Samuel Kieser
ATTORNEY

SAFETY DEVICE FOR VEHICLES

This invention relates generally to inflatable safety devices, and more particularly to safety devices of the type utilizing an inflatable bag and also to the method of inflating such bags.

A great deal of attention has been given recently to the problem of increasing the safety of passenger vehicles. As well as trying to increase the inherent safety of the vehicle itself, considerable effort has been directed to the development of safety devices which will be automatically responsive to the impact of a vehicle due to an accident to energize a system which will protect the occupants from injury due to that impact. One system of this type utilizes an inflatable containment means such as a bag which is automatically inflated in response to a predetermined condition of the vehicle such as impact or upset, to prevent the occupant from contacting the interior thereof.

In a bag inflation system, several factors are of importance. The time in which the bag must be inflated is very critical. From the time the predetermined condition is sensed by a suitable sensor to the time that the bag must be inflated is measured in terms of milliseconds. Thus one of the important areas of research in this field is the development of a safety device system which will rapidly inflate the confinement means. A system that has been suggested is one that utilizes a storage tank of pressurized fluid such as compressed air and includes an explosive detonator. The shock wave from the detonator ruptures the container permitting the pressurized fluid to escape into the bag and cause the inflation thereof. The present systems require a large storage tank and thus are relatively bulky requiring a lot of space within the vehicle for storage.

Accordingly, it is an object of the present invention to provide an improved safety device of the type including inflatable bag means.

It is an additional object of the present invention to provide an improved inflatable confinement safety device which is more compact than those heretofore designed.

A further object of the present invention is to provide an inflatable confinement safety device which is relatively inexpensive to manufacture.

These and other objects of the present invention will be more readily appreciated by reference to the following description of a preferred embodiment and to the accompanying drawings in which:

FIG. 1 is a partially broken away, fragmentary; vertical sectional view of a vehicle equipped with an embodiment of the present invention and showing the inflatable confinement in an inflated condition;

FIG. 2 is a schematic representation of a safety system incorporating the present invention;

FIG. 3 is a cross-sectional view of the preferred embodiment of the present invention; and FIG. 4 is a sectional view taken along the lines 4—4 of FIG. 3.

Referring to the drawings and particularly to FIG. 1, a vehicle 2 is shown provided with a safety assembly comprising generally a pressure source 4 and an inflatable confinement such as a bag 6. An occupant 8 is shown seated in the front seat 10. The safety device is mounted in the seat 10 with the bag 6 stored in a collapsed condition. With the device shown in FIG. 1, in the event of an impact at the rear of the vehicle 2, the pressure source will be actuated to inflate the bag 6 and prevent the head of the occupant 8 from being snapped rearwardly, thus preventing a whiplash injury to the occupant. It is to be understood that safety devices designed according to the present invention can be placed in other locations. For example, the device may be placed underneath the dashboard or on the inside of the vehicle roof so that when the bag is inflated, the bag will prevent the occupant from being thrown forward and impacting against the windshield, dashboard, steering wheel, or back seat.

The pressure source 4 of the present invention includes a generally cylindrical member 12 having an outlet member 14 welded to one end thereof. The outlet member 14 includes an axial bore 16 closed at one end with the open end facing the interior of the cylindrical member 12. Communication between the bore 16 and the interior of the cylindrical member 12 is normally prevented by means of a rupturable disc 18 adapted to rupture at some predetermined pressure. The other end of the cylindrical member is closed by a housing 20 which may be welded thereto. A propellant charge 22 either in the form of discrete powder granules or as one solid piece, and a squib or detonator device 24 is contained in the housing 20. The housing 20 and outlet 14 serve to provide a closed chamber 26 for storage of a fluid under pressure. The rupturable disc 18 is designed to rupture at a pressure above that of the stored fluid.

A manifold 18 in the form of a suitable conduit is attached to the outlet member 14 and communication between the manifold 28 and bore 16 of the outlet member 14 is provided by a series of small diffusion apertures 29 in the wall of the outlet member 14. The manifold 28 terminates in a funnel-shaped outlet 30 to which the bag 6 is attached in such a manner that the interior of the bag 6 communicates with the outlet 14. The bag 6 is packaged in a collapsed condition in a manner that will not interfere with its expansion.

The arrangement is such that when the propellant is ignited, the hot gas resulting therefrom will heat the fluid in chamber 26 so that the pressure inside the chamber 26 will be increased to a point where the rupture disc 18 will burst and the hot gas and fluid can escape through the outlet member 14 and manifold 28 into the bag 6 to cause the inflation thereof.

More specifically, the housing 20 is provided with a threaded bore 32 for the reception of the squib 24, a first counterbore 34 in which the propellant charge is contained, and a second counterbore 36 for the reception of a retainer 38. The squib 24 may comprise a threaded housing member 40 having a head 42 thereon. An insulating member 44 is positioned in a bore 46 in the housing member 40 and a suitable ignition composition 48 packed between the insulating member 44 and an end closure member 50. Two lead wires 52 and 54 extend through the head 42 of housing member 40 and through the insulating member 44 into the ignition composition 48. A bridge wire 56 extends between the exposed ends of the lead wires 52 and 54.

The retainer 38 comprises a cup-shaped member 58 which is mounted in the second counterbore 36 with the open end facing the chamber 26. The open end of the member 58 is closed by means of a disc 60 and communication is provided between the interior of the retainer 38 and the chamber 26 by means of a plurality of circumferentially spaced apertures 62 through the sidewall of the member 58. The bottom of the cup adjacent the propellant charge 22 is provided with a circular groove 64 to form a weakened rupturable portion 66 which will rupture when the pressure of the burning propellant charge reaches a predetermined amount. The provision of the plurality of small apertures 62 in the member 58 enables the retainer to catch the rupturable portion 66 after it ruptures, and also diffuses the propellant gas to lower the noise level.

In assembly, after the retainer 38 is positioned in the second counterbore 36 and secured to the housing 20, the propellant charge 22 may be packed into the first counterbore 34. The squib 24 may be threaded into bore 32 with the end closure member 50 adjacent the propellant charge 22.

The rupturable disc 18 is attached to the end of the outlet member 14 by means of a washer member 68. The rupturable disc 18 is interposed between the end of the outlet member 14 and the washer 68 and the washer 68 welded or otherwise secured to the outlet member 14 to firmly hold the disc 18 in place.

The manifold 28 is a section of tubing having a shape dictated by the particular application of the safety device. The diffusion apertures 29 in the wall of the outlet member 14 serve to catch the disc 18 after it is ruptured to prevent it from flowing into the bag 6 and also serve to diffuse the exiting fluid and thereby lower the noise level. The end of the funnel-shaped outlet 30 of the manifold 28 is provided with a flange 70 welded thereto. The edges around the opening of the bag 6 are clamped between the flange 70 and an outer ring member 72 and are held in clamping relationship by series members 74.

The housing 20 is provided with a throughbore 78 into which a fill valve 80 is mounted. The fill valve 80 may be similar to tire filling valves. If desired, the chamber 26 may be put under pressure during the welding operation, thus eliminating the need for a fill valve.

When the device is installed in a vehicle, the leads 52 and 54 from the squib 24 are attached to an appropriate sensing device (shown schematically at 76 in FIG. 2), such as an accelerometer or inertia responsive switch designed to sense when the vehicle is involved in an accident. Upon activation of the sensing device, electrical current is passed through the leads 52 and 54 and bridge wire 56 of the squib 24 to set off the ignition composition 48. The ignition composition 48 ruptures the end closure member 50 and ignites the propellant charge 22. The propellant charge 22 generates hot gas and pressure as it burns until the rupturable portion 66 is ruptured. After the rupture of portion 66, the gas from the propellant charge 22 flows into chamber 26 and heats the pressurized fluid stored in the chamber 26. The heating of the fluid in the chamber 26 along with the gas generated by the burning of the propellant charge 22 results in an increase in pressure within the chamber 26. When the pressure rises to a predetermined level, the rupture disc 18 will rupture permitting the fluid and gas to pass through the outlet member 14, through the openings 29 into the manifold 28 and then into the bag 6 to cause the inflation thereof.

When air is used as the stored fluid, it has been found that about an 8 to 1 air-to-propellant ratio by weight is generally satisfactory. With such a ratio, approximately one-half of the inflation energy is supplied by the propellant due mainly to the heating of the air. As an example, when a one cubic foot bag is to be used as a headrest in an automobile, it must be inflated to a pressure between 4 to 9 psig within 40 to 60 milliseconds. For this purpose, 21 gms., of air are stored in chamber 26 at a pressure of about 815 psia. Approximately 2.5 gms. of a double base propellant, i.e., a propellant containing nitrocellulose and nitroglycerin is provided in housing 20.

It has been found that the rupture disc 18 should have a rupturing point approximately 50% above the pressure of the fluid in the chamber 26. Accordingly, in the example given above, the heat and gas from burning of the propellant charge will increase the pressure in the chamber 26 to approximately 1,400 psi. However, the rupture disc 18, which has been designed to rupture at 1,2500 psi; will have burst and some of the mixture of propellant gas and air will be flowing from the chamber 26 into outlet 14 as the pressure in chamber 26 builds to 1,400 psi. At this time the temperature of the air-propellant-gas mixture in the chamber 26 is about 1,000° F. Following deployment of the bag, this mixture is at a temperature of approximately 450° F. The temperature of the external bag surface will be about 140° F. The temperature of the external bag surface will be about 140° F., which is considerably below the maximum temperature of 200° F. which can be tolerated. In the event that it is desired to inflate a larger bag, either the storage chamber size or the pressure of the stored fluid must be increased. The amount of the propellant is also increased so that the ratio of the stored fluid to the propellant charge remains consistent at the desired level.

When air is used as the fluid, there is a reaction between the hot fuel-rich propellant gas and/or partially burned propellant and the oxygen in the air in chamber 26 when rupture portion 66 of the retainer 38 ruptures to permit the gas and/or powder to move from the housing 20 into the chamber 26. This results in more heat being obtained from a given size propellant charge than would be obtained if an inert gas such as nitrogen was used in place of air. When an inert gas is used, it may be desirable to mix the inert gas with oxygen to provide for this reaction and additional heat. For any given type of propellant, it is possible to calculate the theoretic ratio of oxygen to propellant to provide for a complete reaction of the oxygen. However, in view of the fact that there probably is not enough time for a complete reaction of all the oxygen with the gas and propellant, an excess of oxygen is desirable.

The above example of the use of air or oxygen is not, however, intended to preclude the use of a larger powder charge and an inert gas. In all cases, it is desirable that enough propellant be provided so that at least one-half of the energy for inflating the bag comes from the propellant. Also, in all cases, it is necessary that the temperature of the external bag surface remain below the maximum temperature of 200° F. when the bag is inflated.

What is claimed is:

1. A safety device for protecting the occupant of a vehicle comprising:
   a. an inflatable bag member;
   b. container means for storing a fluid under pressure;
   c. means providing communication between the interior of said bag member and the interior of said container means;
   d. rupturable means closing said means providing communication for preventing passage of the fluid from the interior of the container means to the bag member; and
   e. storage means for storing a propellant charge means;
   f. a propellant charge means in said storage means for producing a hot gas;
   g. means providing communication between said storage means and said container means when said propellant means is ignited for causing the rupturing of said rupturable means to permit the hot gas and fluid from the container to escape into the bag member and cause the inflation thereof;
   h. said propellant charge and said fluid under pressure being present in respective amounts so that the propellant charge contributes at least 50 percent of the energy needed for inflating the bag and that the resultant temperature of the external bag surface upon inflation is below 200° F.

2. The safety device of claim 1 wherein said rupturable means has a rupturing point 50 percent above the pressure of the fluid in the container means.

3. The safety device of claim 2 wherein air is stored in said container means.

4. A safety device for protecting the occupant of a vehicle comprising:
   a. an inflatable bag member;
   b. a storage container for storing a fluid under pressure;
   c. manifold means for connecting the interior of said storage container to the interior of said bag;
   d. a rupturable member sealing the interior of said container from the interior of said bag and having a predetermined rupturing point above the pressure of said fluid;
   e. diffusion means between said container and said manifold to prevent the rupturable member from passing into the bag after rupture and diffuse the fluid exiting from said compartment;
   f. storage means for storing a propellant charge;
   g. a propellant charge in said storage means;
   h. means providing communication between said storage means and said container when said propellant is ignited;
   i. a second rupturable member between said storage means and said container, and having a predetermined rupturing point; and
   j. second diffusion means between said second rupturable member and said compartment for preventing said second rupturable means from passing into said compartment after it ruptures and to diffuse the gas generated by the propellant upon the ignition thereof so that the generated gas and fluid mix.

5. The safety device of claim 4 wherein said second diffusion means comprises a hollow body, the interior of which is in communication with said storage compartment when said second rupturable member ruptures, said body having a plurality of apertures through its wall providing communication between the interior of said body and said compartment.

* * * * *

UNITED STATES PATENT OFFICE
CERTIFICATE OF CORRECTION

Patent No. 3,655,217                    Dated April 11, 1972

Inventor(s) James T. Johnson

It is certified that error appears in the above-identified patent and that said Letters Patent are hereby corrected as shown below:

In column 2, line 16, please delete "18" and insert --28--.

In column 3, line 51, please delete "1,2500" and insert --1,250--.

In column 3, lines 58-59, please delete "The temperature of the external bag surface will be about 140° F."

Signed and sealed this 12th day of September 1972.

(SEAL)
Attest:

EDWARD M. FLETCHER, JR.                ROBERT GOTTSCHALK
Attesting Officer                      Commissioner of Patents FORM PO-1050 (10-69)                                   USCOMM-DC 60376-P69
                                       ☆ U.S. GOVERNMENT PRINTING OFFICE : 1969 O--366-334